(12) United States Patent
Aulick

(10) Patent No.: US 7,293,640 B1
(45) Date of Patent: Nov. 13, 2007

(54) DISCHARGE CONVEYOR SYSTEM FOR A TRUCK OR TRAILER BODY

(76) Inventor: Vinc L. Aulick, 730 Avenue "I", Scottsbluff, NE (US) 69361

( * ) Notice: Subject to any disclaimer, the term of this patent is extended or adjusted under 35 U.S.C. 154(b) by 37 days.

(21) Appl. No.: 11/447,661

(22) Filed: Jun. 6, 2006

(51) Int. Cl.
*B65G 17/12* (2006.01)

(52) U.S. Cl. ...................... 198/817; 414/528

(58) Field of Classification Search ............... 198/817, 198/849, 703, 711, 529, 550.01, 550.12; 414/327, 527, 528
See application file for complete search history.

(56) References Cited

U.S. PATENT DOCUMENTS

| | | | | |
|---|---|---|---|---|
| 1,438,566 A * | 12/1922 | Wiggins | ...................... | 198/842 |
| 2,717,703 A * | 9/1955 | Kull et al. | ................... | 414/327 |
| 3,447,668 A * | 6/1969 | Jernigan | ..................... | 198/834 |
| 3,901,377 A * | 8/1975 | Euverard et al. | ........... | 198/606 |
| 4,055,265 A * | 10/1977 | Eisenman | .................... | 414/327 |
| 4,664,583 A * | 5/1987 | Gust | .......................... | 414/528 |
| 4,741,431 A * | 5/1988 | Whitehead | ............... | 198/844.1 |
| 5,102,285 A | 4/1992 | Gust | .......................... | 414/528 |
| 6,220,810 B1 * | 4/2001 | Wilkerson | .................. | 414/528 |

\* cited by examiner

*Primary Examiner*—James R. Bidwell
(74) *Attorney, Agent, or Firm*—Thomte Law Office; Dennis L. Thomte

(57) ABSTRACT

A discharge conveyor for an elongated truck or trailer body which includes a plurality of relatively long conveyor belt sections having leadings ends which are bolted to support members which extend between a pair of spaced-apart chains. Each of the conveyor belt sections are secured to a plurality of the support members in such a manner so as to provide a freely movable flap at the trailing end thereof. When the conveyor is moving through its discharge section, the trailing end of the conveyor belts overlap the leading end of the trailing conveyor belt section. When the conveyor is moving through its return section, the flaps of the conveyor belt sections hang downwardly from the chains.

6 Claims, 5 Drawing Sheets

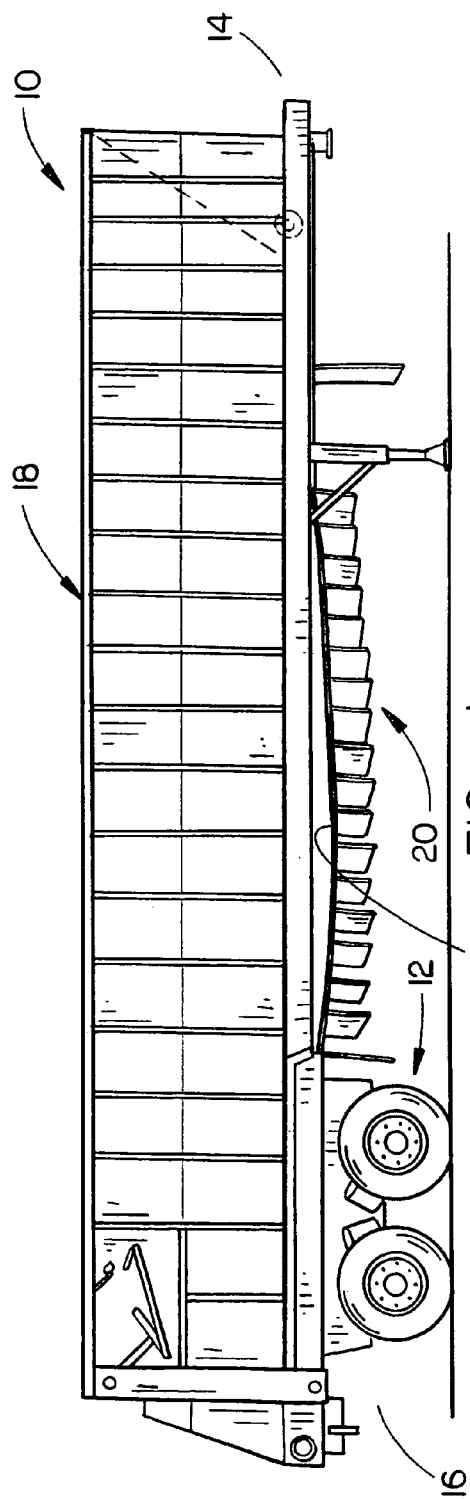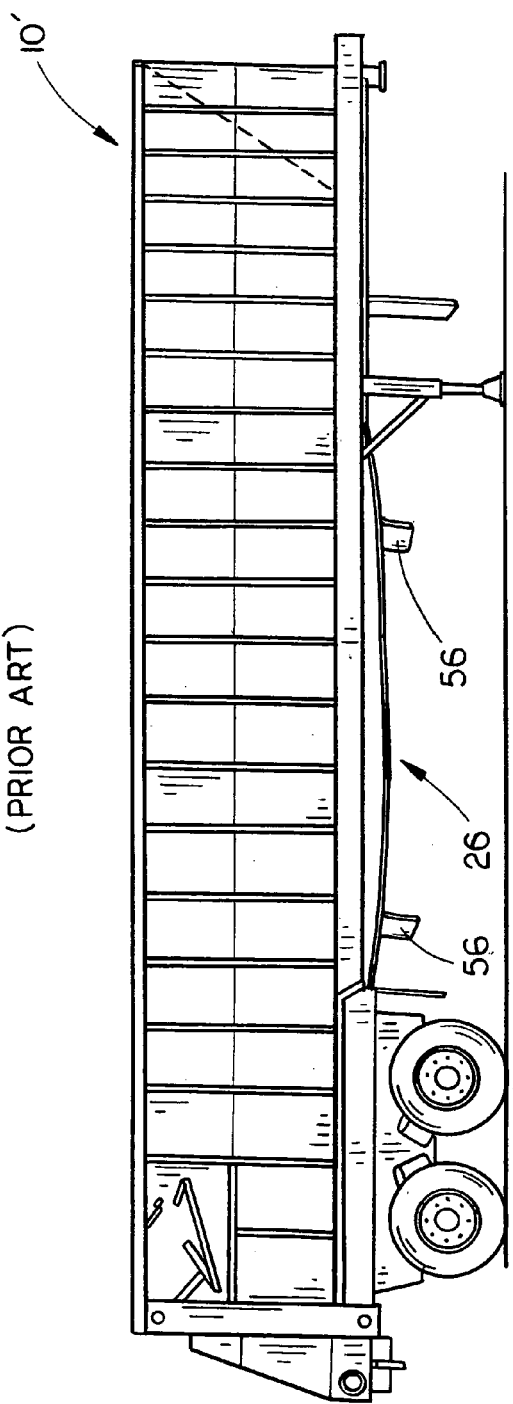
FIG. 1 (PRIOR ART)
FIG. 2

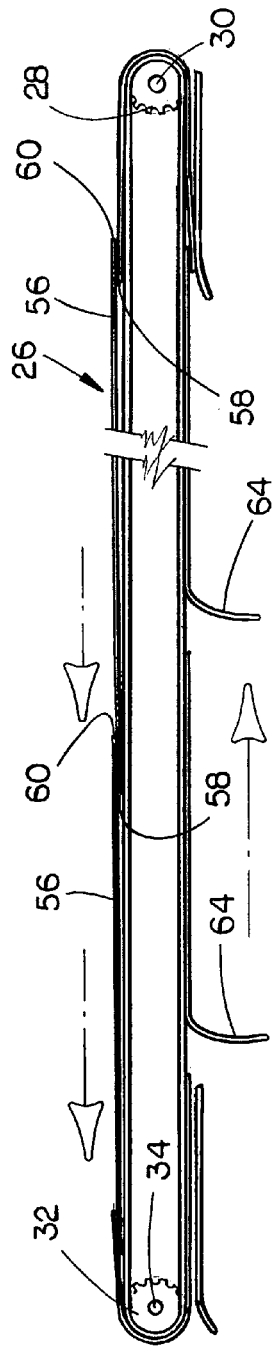
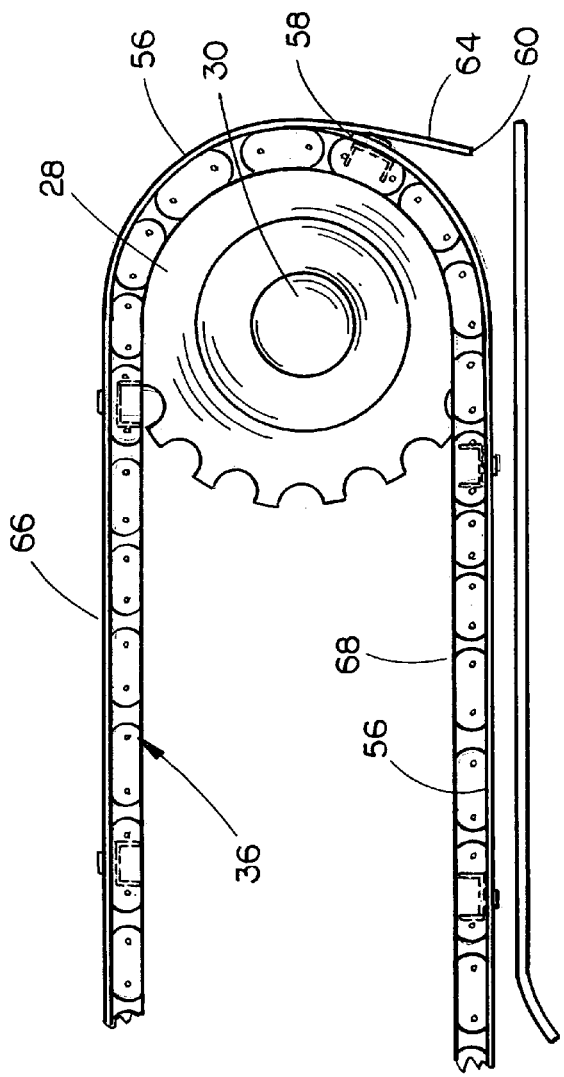

DISCHARGE CONVEYOR SYSTEM FOR A TRUCK OR TRAILER BODY

BACKGROUND OF THE INVENTION

1. Field of the Invention

This invention relates to a discharge conveyor system for an elongated truck or trailer body and more particularly to a discharge conveyor system wherein the discharge conveyor is comprised of a plurality of relatively long overlapping conveyor belt sections secured to a pair of chain members.

2. Description of the Related Art

Many types of discharge conveyors have been employed for truck or trailer bodies. One type of discharge conveyor used on bulk trucks or trailers is an elongated screw conveyor which is mounted at the lower end of the body and which extends from the forward end of the body to the rearward end of the body so that the material is discharged from the rearward end of the body. Another type of discharge conveyor used on bulk feed trucks or trailers is an endless belt conveyor which is mounted at the lower end of the body and which extends from the forward end of the body to the rearward end of the body so that the material is discharged from the rearward end of the body. A third type of discharge conveyor used in bulk trucks or trailers is one wherein a conveyor belt is comprised of a plurality of short conveyor belt sections which are secured to a pair of chain members in such a manner so that as the conveyor conveys the material rearwardly in the body, the individual conveyor belt sections overlap one another.

All of the conveyor systems described above have advantages and disadvantages. One disadvantage of the screw conveyor is that it is expensive and is somewhat difficult to clean. The conveyor system which incorporates a single endless conveyor belt is difficult to clean due to the fact that the bulk product tends to get beneath the belt or between the discharge and return sections of the belt. A disadvantage of the conveyor wherein the conveyor is comprised of a plurality of conveyor belt sections secured to a pair of chains is that they are somewhat expensive to manufacture and difficult to fabricate since a large number of the conveyor belt sections must be bolted or otherwise secured to the supports which extend between the conveyor chains.

SUMMARY OF THE INVENTION

A discharge conveyor system is provided for an elongated truck or trailer body mounted on a wheeled frame means having a rearward end and a forward end. The conveyor system comprises first and second, vertically disposed and horizontally spaced-apart front sprockets rotatably mounted on the body adjacent the lower forward end thereof about a horizontal axis transverse to the longitudinal axis of the body. First and second, vertically disposed and horizontally spaced-apart rear sprockets are rotatably mounted on the body adjacent the lower rearward end thereof about a horizontal axis transverse to the longitudinal axis of the body. A first chain member extends around and between the first front sprocket and the first rear sprocket. A second chain member extends around and between the second front sprocket and the second rear sprocket. A plurality of horizontally disposed, elongated support members are secured to the first and second chain members. A plurality of flexible, relatively long conveyor belt sections having opposite sides, a leading end and a trailing end are also utilized. The leading end of each of the conveyor belt sections is secured to one of the support members. Each of the conveyor belt sections is secured to a plurality of the support members intermediate the leading and trailing ends thereof whereby the trailing end and a portion of the conveyor belt section is not secured to a support member to provide a freely movable trailing flap portion at the trailing end of the conveyor belt section. The first and second chain members, the support members and the conveyor belt sections define a conveyor having an upper rearwardly moving discharge section and a lower forwardly moving return section. The trailing flap portions of the conveyor belt sections, while moving through the discharge section, overlap a portion of the leading end of a trailing conveyor belt section. The trailing flap portions of the conveyor belt sections, while moving through the return section, are free to hang downwardly from the first and section chain members for at least a portion of the length of the return section to enable the conveyor to self-clean itself. Preferably, each of the conveyor belt sections are secured to approximately 14 support members and have a length of approximately 193 inches and a width of approximately 54 inches although different lengths and widths may be employed. In the conveyor system of this invention, the conveyor is comprised of less conveyor belt sections than the conventional conveyor system described above.

It is therefore a principal object of the invention to provide an improved discharge conveyor system for a truck or trailer body.

A further object of the invention is to provide discharge conveyor system of the type described which is comprised of a plurality of conveyor belt sections secured to a pair of chain members.

A further object of the invention is to provide a discharge conveyor system which is self-cleaning and which may also be easily cleaned.

A further object of the invention is to provide a discharge conveyor system which is easy to fabricate.

Still another object of the invention is to provide a discharge conveyor system which is less expensive to fabricate than conventional conveyor systems utilizing multiple conveyor belt sections.

These and other objects will be apparent to those skilled in the art.

BRIEF DESCRIPTION OF THE DRAWINGS

FIG. 1 is a side view of a trailer body having the discharge conveyor system of this invention mounted thereon;

FIG. 2 is a side view of a trailer body having the conveyor system of this invention mounted thereon;

FIG. 6 is a side view illustrating the conveyor of this invention; and

FIG. 7 is an enlarged side view of a portion of the discharge conveyor system of this invention.

DETAILED DESCRIPTION OF THE INVENTION

Figure 3:
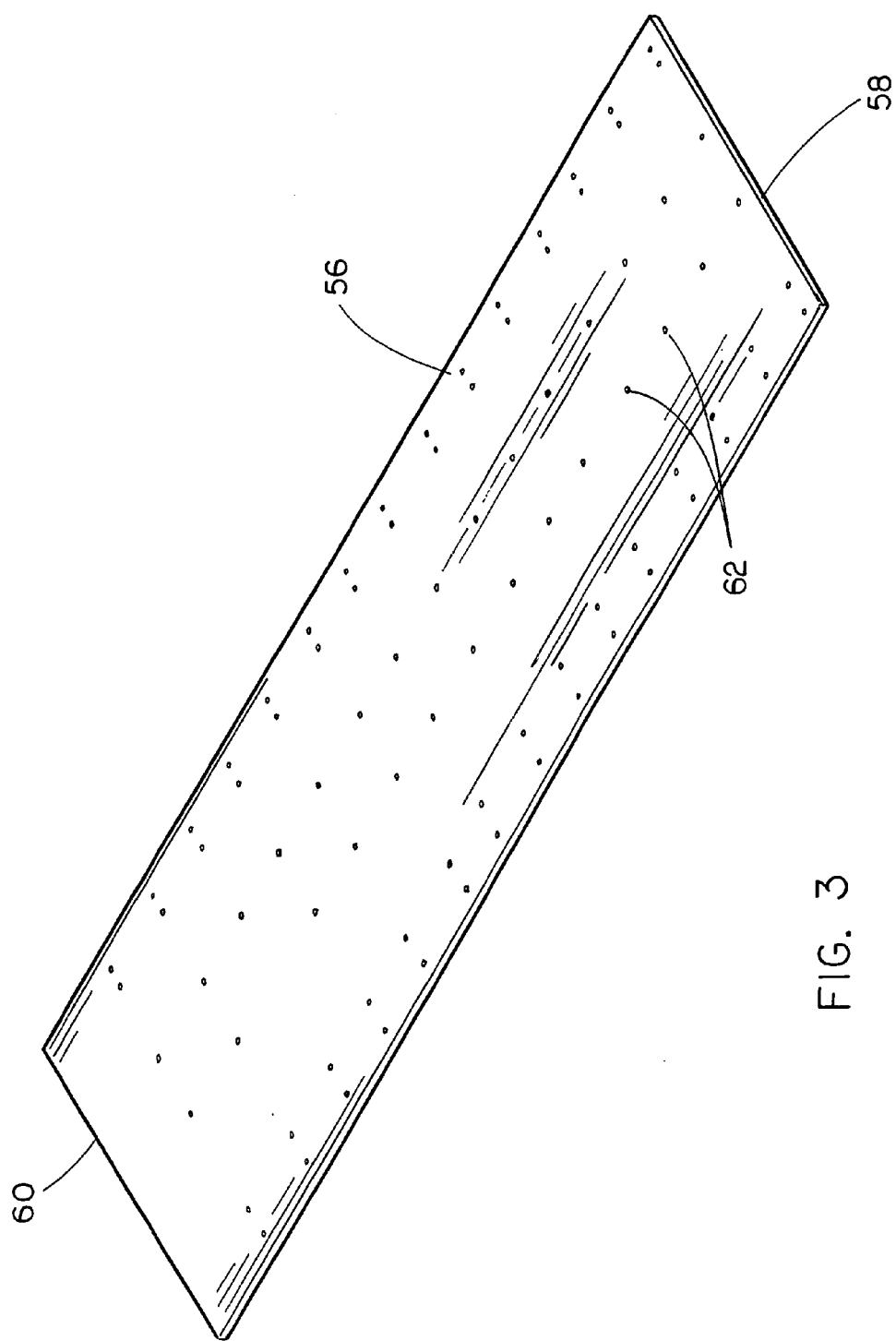
FIG. 3 is a perspective view of one of the conveyor belt sections of the conveyor system of this invention.

FIG. 1 illustrates a prior art trailer which is indicated by the reference numeral 10. Trailer 10 includes a wheeled frame means 12 having a forward end 14, rearward end 16, and a body or box 18 mounted thereon. A conveyor system 20 is provided on the trailer for conveying the contents of the trailer from the forward end of the body 18 to the discharge end of the body 18. Conveyor 20 is of the type wherein a plurality of conveyor belt sections 22 are secured to a conveyor chain assembly 24 comprised of a pair of spaced-apart chains.

FIG. 2 illustrates a trailer 10' which is identical to trailer 10 in FIG. 1 except that the conveyor system 26 is quite different than the conveyor system 20 of FIG. 1. Conveyor system 26 includes a pair of front conveyor sprockets 28 which are vertically disposed and which are mounted on a shaft 30. The sprockets 28 are horizontally spaced-apart and only one of the sprockets 28 is illustrated in FIGS. 6 and 7. Similarly, a pair of rear sprockets 32 are mounted on shaft 34 in a horizontally spaced relationship. Only one of the sprockets 32 is illustrated for purposes of conciseness.

Figure 4:
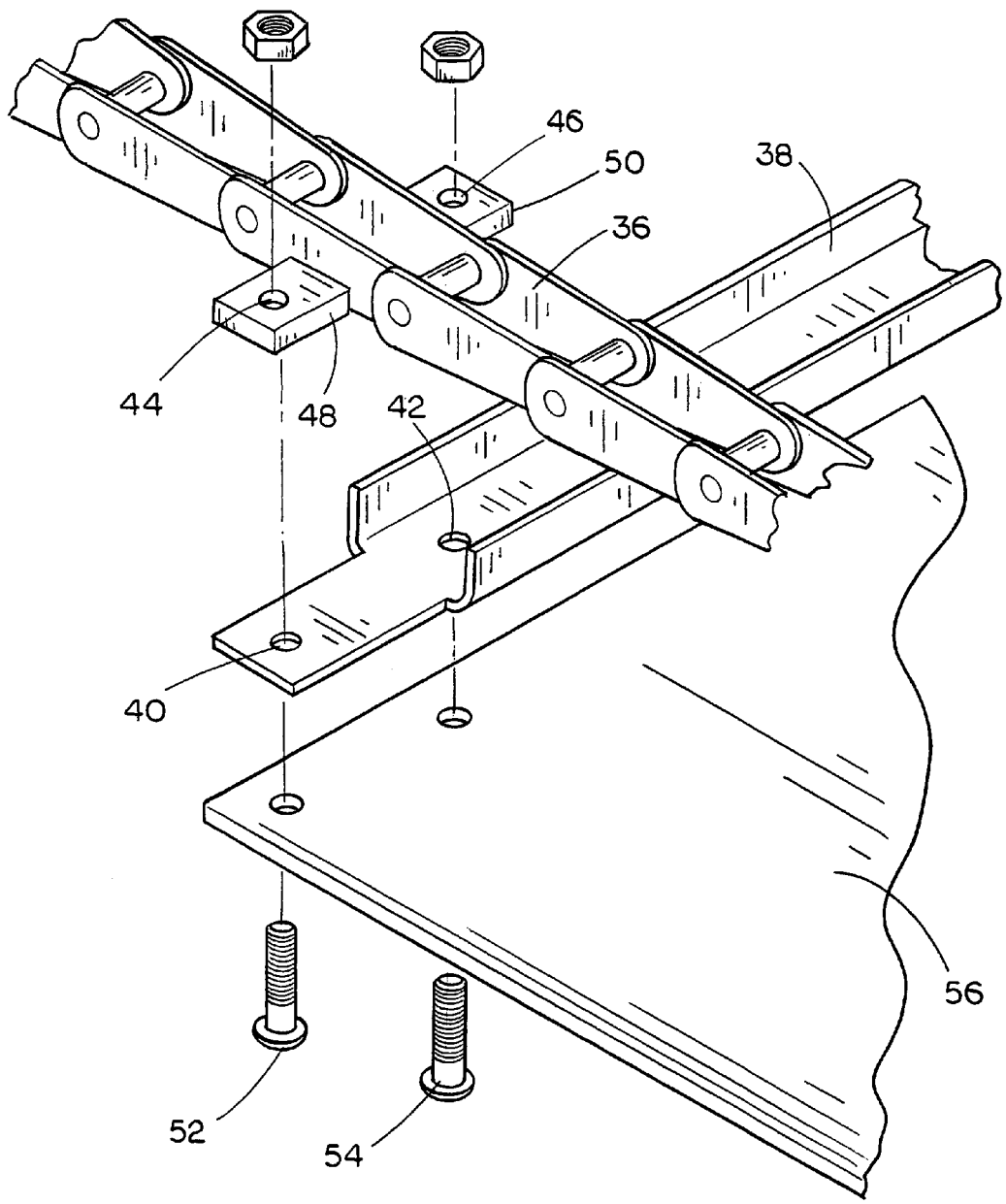
FIG. 4 is perspective view of illustrating the manner in which the conveyor belt sections of FIG. 3 is secured to the conveyor chain.
Figure 5:
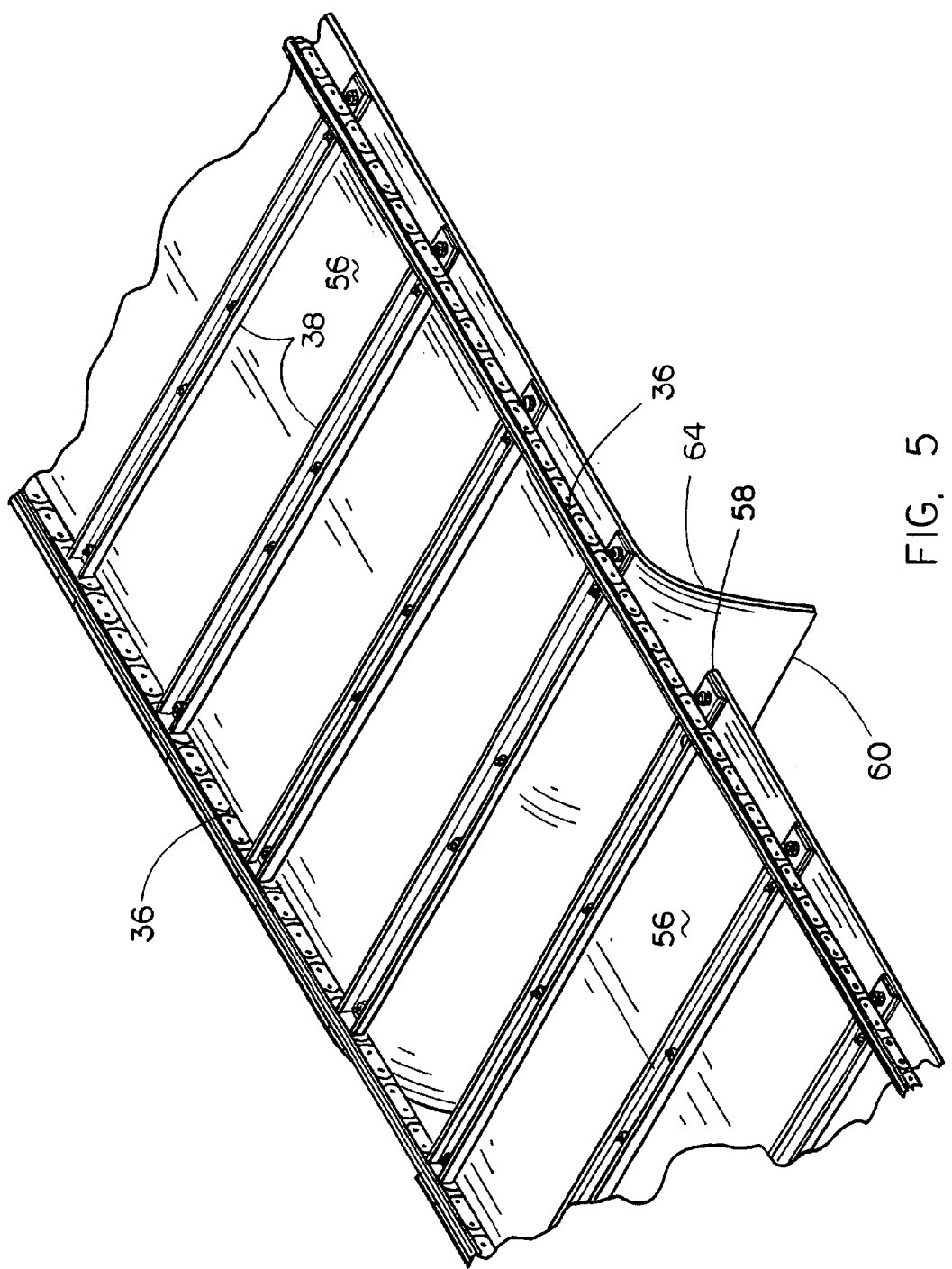
FIG. 5 is a perspective view of illustrating the manner in which the conveyor belt sections of this invention are secured to the conveyor chain.

A chain 36 is secured to and extends between one of the sprockets 28 and 32 while another chain 36 extends between the other sprocket 28 and the other sprocket 34. In other words, a pair of the chains 36 are provided, as illustrated in FIG. 5. A plurality of U-shaped support members or channels 38 are secured to the chains 36 and extend therebetween, as illustrated in FIG. 5. In this embodiment, it is preferred that the support members 38 be secured to the chains 36 at approximately a 13.5 inch spacing, but other spacings may be used. FIG. 4 illustrates the manner in which one end of the support members 38 are secured to the chain 36. As seen in FIG. 4, the end of the support member 38 is provided with a pair of bolt openings 40 and 42 which are aligned with the bolt openings 44 and 46 on the ears 48 and 50 which are secured to chain 36 by welding or the like. Bolts 52 and 54 not only secure the support members 38 to the chains 36, but also secure conveyor belt section 56 to one end of the support member 38, as illustrated in FIG. 4.

Instead of a very large number of conveyor belt sections 22, as illustrated in the prior art device of FIG. 1, the conveyor belt sections 56 of this invention are relatively long so as to reduce the number of conveyor belt sections required in the conveyor system. Preferably, each of the conveyor belt sections 56 is approximately fifty-four inches wide and approximately 193 inches long, although those dimensions may be varied as desired. Each of the conveyor belt sections 56 includes a leading end 58 and a trailing end 60. The leading end 58 of one of the conveyor belt sections 56 is secured to one of the support members 38, as illustrated in FIG. 5. The conveyor belt section 56 is secured to a plurality of the support members 38. Preferably, each of the conveyor belt sections 56 is secured to approximately fourteen support members 38 in a manner such as illustrated in FIG. 5. FIG. 3 illustrates one of the conveyor belt sections 56 as well as the bolt opening patterns therein. Conveyor belt section 56 is provided with a plurality of rows of bolt openings 62 formed therein with one of the rows 62 being formed adjacent the leading end 58 and the last row of bolt openings 62 being formed in a spaced-apart relationship with respect to the trailing end 60, as illustrated in FIG. 3, so that when the belt section 56 is secured to the chains 36, as illustrated in FIG. 5, a flap portion 64 is provided which hangs downwardly from the last support member 38 to which the belt section 56 is secured.

As the conveyor belt is operated by the rotation of the sprockets 28 or 32, the leading end 58 of a conveyor belt section 56 moves upwardly between the flap 64 on a leading conveyor belt section 56, as illustrated in FIG. 7. FIG. 6 illustrates the manner in which the overlapping effect is achieved.

The conveyor system of this invention defines what may be termed a discharge section 66 and a return section 68. The return section 68 includes a portion which is exposed, as illustrated in FIG. 2, so that the conveyor belt sections 56 may be cleaned by hosing or the like. Further, the conveyor belt sections 56 are "self-cleaning" due to the fact that the flaps 64 hang downwardly, as seen in FIG. 2, to open up gaps between the sections 56. As illustrated in FIG. 2, the return section 68 has a small amount of slack which does permit both sides of the conveyor belt sections 56 to be exposed to be cleaned.

The conveyor system of this invention is an improvement over the prior art device of FIG. 1 in that the same is cheaper to fabricate and assemble than that of FIG. 1. The conveyor belt assembly or discharge conveyor of FIG. 2 is easier to clean than the conventional endless belt conveyor system of the prior art. Further, the conveyor system of this invention is constructed of less material than that illustrated in FIG. 1 since it requires less material due to less overlapping of the belt sections.

Although the conveyor system of this invention is ideally suited for use on trailer bodies, the conveyor system may also be used on the bodies of straight trucks.

Thus it can be seen that the invention accomplishes at least all of its stated objectives.

I claim:

1. A discharge conveyor system for an elongated truck or trailer body mounted on a wheeled frame means having a rearward end and a forward end, an upper end and a lower end, comprising:

first and second, vertically disposed and horizontally spaced-apart front sprockets rotatably mounted on the body adjacent the lower forward end thereof about a horizontal axis transverse to the longitudinal axis of the body;

first and second, vertically disposed and horizontally spaced-apart rear sprockets rotatably mounted on the body adjacent the lower rearward end thereof about a horizontal axis transverse to the longitudinal axis of the body;

a first chain member extending around and between said first front sprocket and said first rear sprocket;

a second chain member extending around and between said second front sprocket and said second rear sprocket;

a plurality of horizontally disposed, elongated support members secured to said first and second chain members in a spaced-apart relationship;

a plurality of flexible, conveyor belt sections having opposite sides, a leading end and a trailing end;

the leading end of each of said conveyor belt sections being secured to one of said support members;

each of said conveyor belt sections being secured to a plurality of said support members intermediate its leading and trailing ends whereby said trailing end and a portion of the conveyor belt section is not secured to a support member to provide a freely movable trailing flap portion at the trailing end of the conveyor belt section;

said first and second chain members, said support members and said conveyor belt sections defining a conveyor having an upper rearwardly moving discharge section and a lower forwardly moving return section;

said trailing flap portions of said conveyor belt sections, while moving through said discharge section, overlapping a portion of the leading end of a trailing conveyor belt section;

said trailing flap portions of said conveyor belt sections, while moving through at least a portion of said return section, being free to hang downwardly from said first and second chain members.

2. The conveyor system of claim 1 wherein said support members are spaced-apart approximately 13.5 inches.

3. The conveyor system of claim 2 wherein each of said conveyor belt sections is secured to approximately 14 support members.

4. The conveyor system of claim 3 wherein each of said belt sections is approximately 193 inches.

5. The conveyor system of claim 4 wherein each of said flap sections is approximately 17.5 inches.

6. The conveyor system of claim 4 wherein each of said belt sections has a width of 54 inches.

\* \* \* \* \*